Figure 1:
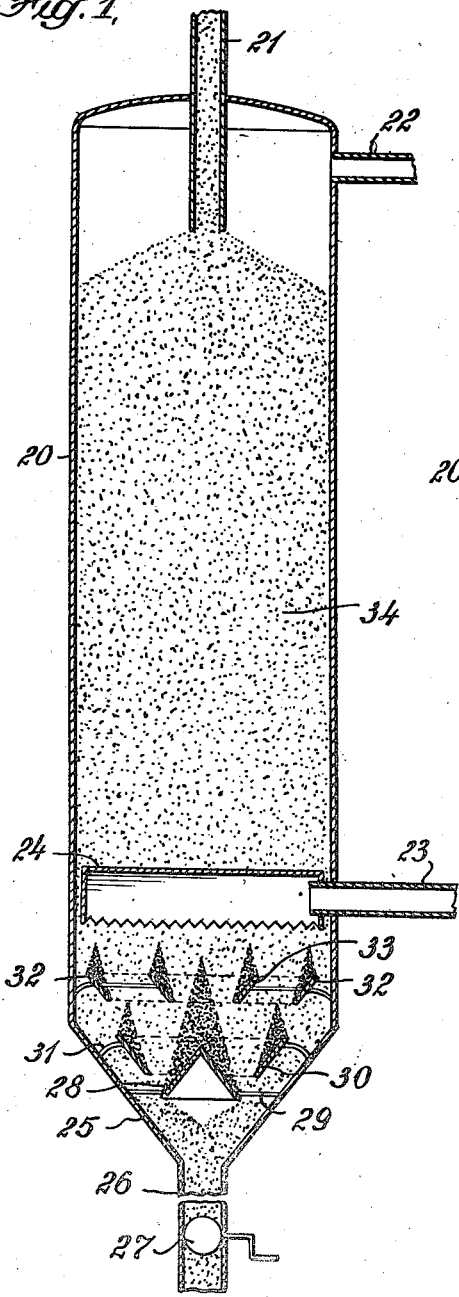

Nov. 11, 1947.   J. A. CROWLEY, JR   2,430,669
METHOD AND APPARATUS FOR CONTACTING GASES WITH SOLID CONTACT MATERIALS
Filed July 13, 1944   3 Sheets-Sheet 1

JOHN A. CROWLEY JR.
INVENTOR

BY
ATTORNEY

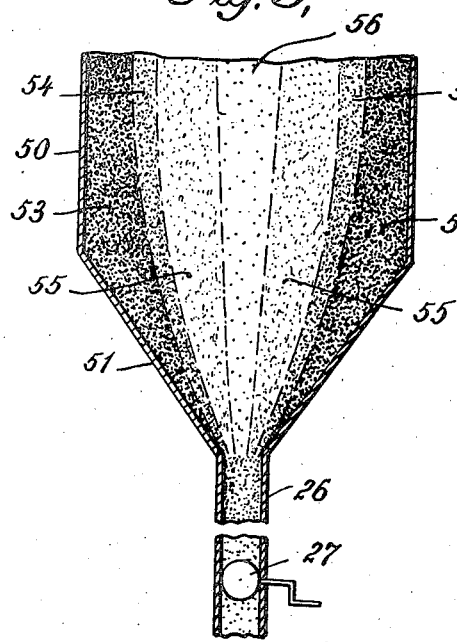
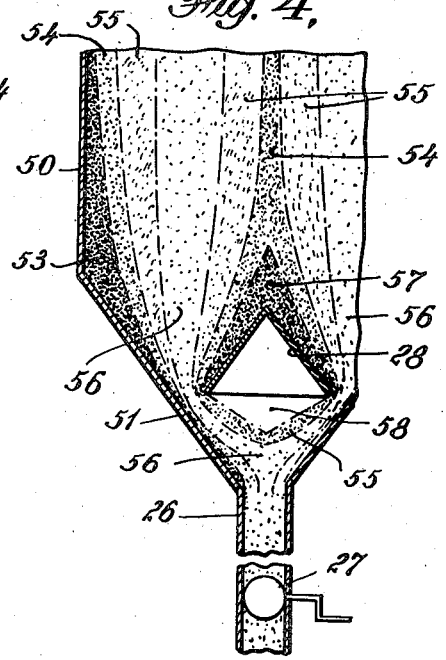
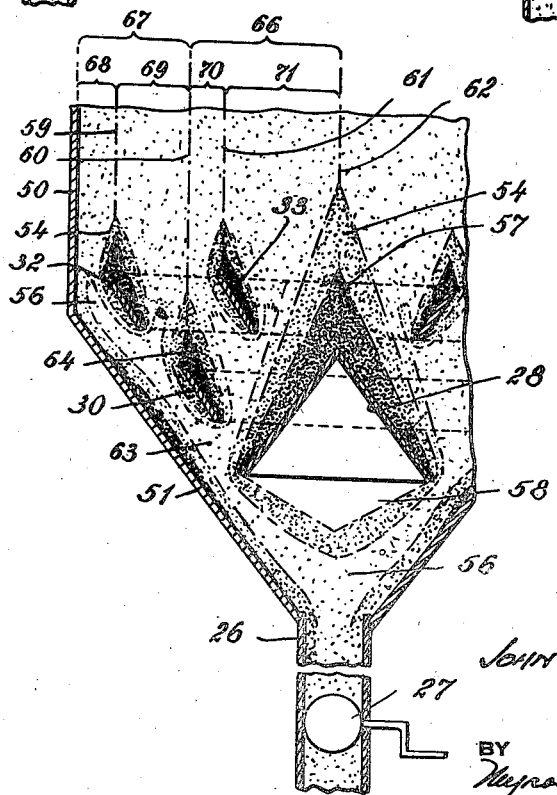

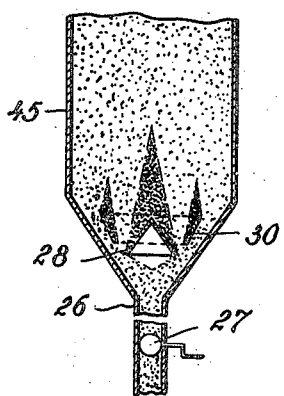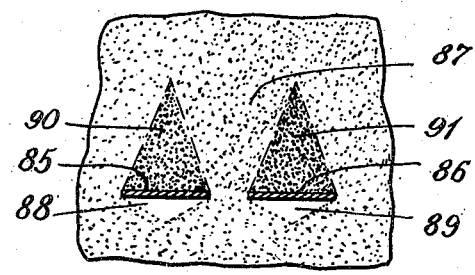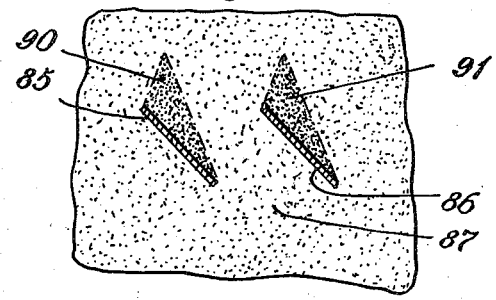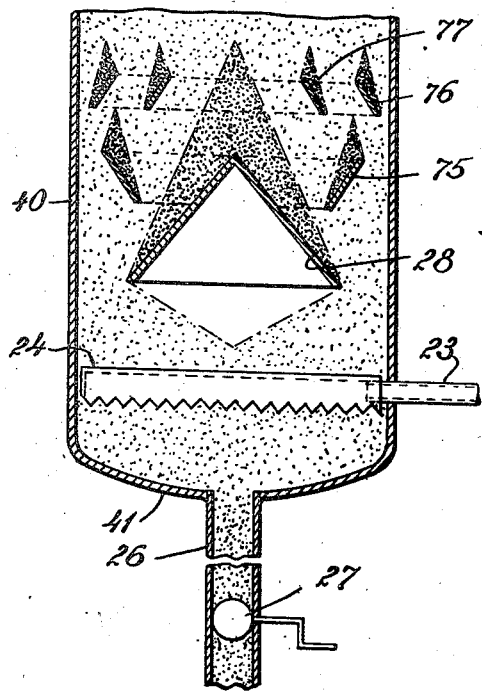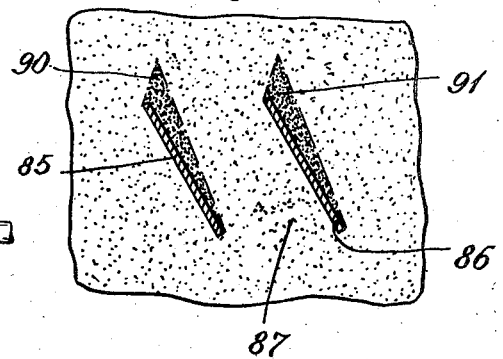

Patented Nov. 11, 1947

2,430,669

UNITED STATES PATENT OFFICE 2,430,669

METHOD AND APPARATUS FOR CONTACTING GASES WITH SOLID CONTACT MATERIALS

John A. Crowley, Jr., Scarsdale, N. Y., assignor to Socony-Vacuum Oil Company, Incorporated, a corporation of New York Application July 13, 1944, Serial No. 544,781

9 Claims. (Cl. 196—52)

This invention has to do with methods and apparatus for contacting gases with particle form solid contact materials for purposes of gaseous reactions, gaseous-solid reactions, gaseous-solid heat exchange or any of a number of other purposes. Exemplary of the processes of this kind is the cracking conversion of relatively high boiling point hydrocarbons to gasoline and other products at suitable conditions of temperature and pressure in the presence of a particle form solid adsorptive catalytic contact mass material. Such contact material may take the form of natural or treated clays and/or various associations of silica and alumina, either natural or synthetic, various carrier materials containing added materials such as metallic oxides and other adsorptive materials. In a most recent form this operation has been developed as one in which the particle form solid contact mass material is moved cyclically through two zones in the first of which it is subjected to reaction and in the second of which it is subjected to the action of a fluid regeneration medium, such as a combustion supporting gas, acting to burn off contaminant materials deposited upon the contact mass during reaction.

This invention has specifically to do with processes and apparatus for conduct of such processes wherein gases are contacted with a column of flowing particle form contact mass material.

A major object of this invention is the provision of a method and apparatus by which particle form solid material may be withdrawn from a vessel of relatively large cross sectional area wherein a substantially compact column of said solid material is maintained while maintaining substantially uniform downward flow of said solid across all portions of said column and while permitting uniform vapor contact of all portions of said column within the vapor contacting zone of said vessel.

Another object of this invention is the provision of method and apparatus whereby particle form solid material may be withdrawn from a vessel of large cross-section while maintaining uniform downward flow of said solid across the entire cross sectional area of said vessel thereabove.

A specific object of this invention is the provision of a method and apparatus in such a process as above described wherein all portions of a column of flowing particle form solid contact mass material may be uniformly contacted with gasiform reactants in the reaction zone.

These and other objects of this invention will become apparent in the following description of the invention.

The successful operation of processes involving continuous flow of particle form contact mass material as in the cracking and regeneration steps of the continuous conversion process outlined above, requires that the rate of flow of the contact material be uniform throughout the reaction zones of these vessels. When granular material is discharged from the base of a vessel through an outlet of relatively small size compared with the cross-section of the vessel, the velocity of flow will vary widely across a horizontal cross-section of the vessel and will be greatest directly above the outlet. This difference in velocity decreases at higher levels in the vessel, but, practically, equal velocity and even flow is never obtained in a large vessel if its cross sectional area is much greater than that of the outlet. Previous methods have involved the use of grates or multiple ports individually regulated in an attempt to achieve even flow of particle form material in large vessels. Grates present mechanical difficulties, and the individual and concurrent control of multiple ports is too complicated for practical manual control and automatic regulators prove expensive and troublesome under high temperature operating conditions.

The present invention not only avoids the above difficulties and permits maintenance of substantially uniform downward flow of particle form solid within a vessel of large cross-section while said solid is withdrawn from the bottom of said vessel through a single or through relatively few outlets of small cross-section, but also requires the devotion of a relatively small fraction of the vessel height for the purpose, and substantially reduces the volume of the zones of stagnant solid which otherwise would be present in the lower end of said vessel. Moreover, this is accomplished with relatively little decrease in the solid volumetric capacity or free cross sectional area for gas flow within the small height of the vessel devoted to the apparatus of the invention.

Figure 2:
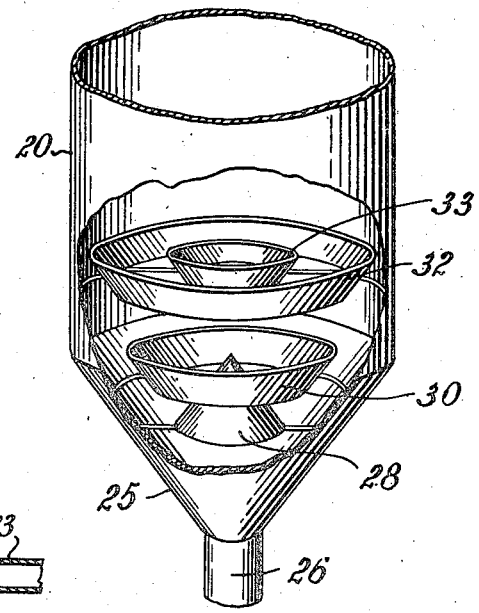

The invention may be more readily understood by reference to the drawings attached to this specification. In these drawings Figure 1 is an elevational view, partially in section, showing a typical conversion vessel provided with means for equalization of solid flow therein by the method of this invention, and Figure 2 is a pictorial view of a cutaway section of the lower end of such a vessel with the baffle arrangement of this invention therein. Figure 3 is an elevational view, partially in section, showing the lower end of such vessels and the nature of solid flow therein, without the baffles of this invention. Figure 4 is a similar view showing the nature of the solid flow after addition of the lowermost baffle, Figure 5 is a similar view showing the nature of the solid flow after the addition of a complete set of baffles, Figure 6 is an elevational view, partially in section, showing the application of a simplified form of this invention to a vessel of relatively small cross-section and Figure 7 is a similar view showing the application of a modified form of the invention to a vessel of different construction. Figures 8, 9 and 10 are cutaway views showing the effect of baffle slope on zones of stagnant solid material thereabove and solid free zones therebelow. All of these sketches are highly diagrammatic in character.

Turning now to Figure 1 we find 20 is an elongated conversion vessel closed at its upper end and having a conical shaped bottom 25 to the lower end of which is connected the solid material outlet conduit 26 with flow control valve 27 therein. Connected through the top of the vessel 20 is the solid material inlet conduit 21, and connected to the shell of the vessel near the upper and lower end thereof are the vapor outlet and inlet conduits 22 and 23, respectively. The inlet conduit 23 is typical of a row of said conduits spaced across the vessel at that cross-section and each of said conduits terminate within the vessel 20 under an inverted channel 24 which extends substantially across the vessel.

Within the lower end of vessel 20 and symmetrically positioned above the entrance to the outlet conduit 26 is the inverted conical shaped baffle 28 supported within the shell by suitable means such as support rods 29. Supported somewhat above baffle 28 and symmetrically thereto is the hoop shaped baffle 30 supported from conical drain section 25 by some suitable means such as rods 31. Likewise supported from the shell of vessel 20 by similar means are similar hoop shaped baffles 32 and 33 concentrically placed.

All of these baffles are of such construction and so positioned as to provide substantially uniform downward flow of solid across the entire cross-section of the vessel within a short distance above the baffles 32 and 33. In operation gaseous hydrocarbons at reaction conditions of temperature and pressure may be introduced through conduits 23 and distributed by channels 24. The hydrocarbons then pass upwardly through the column of uniformly flowing solid contact mass material particles 34 and finally leave the conversion vessel through the conduit 22. At the same time contact mass material may be introduced to the vessel 20 through pipe 21 and withdrawn through the single centrally located conduit 26, the flow of contact material being throttled by valve 27. It will be noted that the column of contact material is substantially continuous and unbroken between the top thereof and the throttle valve 27 thereby providing an adequate seal for prevention of the loss of undue quantities of reactant gas through the contact material outlet.

The form of the baffles may be clearly seen from study of Figure 2 which is a cutaway isometric view showing diagrammatically the lower end of the vessel 20, the conical drain section 25, the solid material outlet conduit 26 and the baffles 28, 30, 32 and 33.

The method by which the baffles accomplish their purpose may be more readily understood by reference to Figures 3, 4 and 5, in each of which is shown, partially in section, the lower end of a vessel 50 having a conical drain section 51 and having a solid material outlet conduit 26, the cross sectional area of which is substantially less than that of said vessel. Also shown is the flow throttle valve 27 on conduit 26. The vessels shown in these figures are intended to be generally circular in cross-section for the purposes of discussion.

As shown in Figure 3, when solid material is withdrawn from a vessel of large cross-section through a single centrally located outlet of relatively small cross-section in the absence of baffling within said vessel the downward flow of solid at any given horizontal plane within said vessel above said outlet is greatest in the center directly over the center of said outlet and is progressively less the further the radial distance within said vessel from said center line. Moreover if lines be drawn in a general lengthwise direction through points of equal solid flow within the vessel on a vertical plane through the axis of said vessel, a number of concentric zones of approximately parabolic shape will result representing zones of progressively decreasing linear solid flow. Several of such imaginary lines are represented by the dotted lines in Figure 3 thereby dividing the column of material into several zones of unequal solid flow. The difference in density of solid particles as shown in these zones is intended to represent difference in linear rate of flow of solid within said zones and not an actual difference in the packing of the solid in said zones. Thus, in zone 53 the solid is stagnant and does not flow at all, in zone 54 the linear rate of solid flow is very low, in zone 55 the rate of solid flow is moderate and in zone 56 the rate of solid flow is excessive. It will be understood that at any horizontal plane within any of these zones excepting zone 53, the rate of solid flow gradually decreases with increasing distance from the central axis of the vessel 50. For practical purposes, however, let it be assumed that in Figure 3 the dotted lines, confining zone 56, confine substantially all of the portion of the column of solid within vessel 50 wherein the downward linear rate of solid flow is substantially above that rate of flow which would be obtained if, for any set volumetric rate of solid withdrawal from the vessel, the solid were withdrawn uniformly from the entire cross-section of the bottom of vessel 50. Then any material within zone 56 can be said to be flowing at an excessive linear rate of flow. It is with this meaning that the term excessive linear rate of solid flow or its equivalent is used hereinafter in the description and claiming of this invention.

According to the method of this invention a baffle 28, see Figure 4, is supported within the conical drain section 51 of vessel 50 symmetrically over the outlet 26. The baffle 28 is of sufficient projected horizontal area to substantially prevent flow of solid at the level of the base of said baffle and shortly thereabove substantially throughout at least that zone having an excessive rate of flow in the absence of the baffle. As a result a new zone 57 of substantially no solid flow is formed directly above the baffle 28. The boundary of this zone is determined by the angle of internal flow of the solid material, and this zone is of relatively small volume. Moreover a new zone in which there is substantially no solid particles at all will be formed directly below the baffle 28 and the boundaries of this zone are determined by the angle of repose of the particle form solid material. The angle of repose of a material is that steepest angle which the side of a pile of the material will attain. To define the angle of internal flow imagine a plane surface supporting an infinite body of the material studied. Pierce a circular hole in the surface and allow the material to flow therethrough. Above the hole there will be a cone within which material moves to and through the hole, and outside of which material remains in place. The angle between an element of the cone and the horizontal is the angle of internal flow which is greater than the angle of repose. The angle of repose and the angle of internal flow will vary depending upon the nature of the particle form solid involved. For dry granular and cylindrical clay type materials, the angle of repose is of the order of 25 to 35 degrees with the horizontal and the angle of internal flow of the order of 60 to 80 degrees with the horizontal. The use of baffle 28 will result in a substantial reduction of the zone of stagnant solid 53 along the walls of the lower end of vessel 50, said reduction being of considerably greater magnitude than the new zone of stagnant solid 57 formed thereby. Moreover, the use of the baffle will shift the zone of excessive flow from the central axis of the vessel. It will be noted that the horizontal cross sectional area of the annular zone of excessive flow 56 in Figure 4 is substantially greater than that of the central zone of excessive flow 56 in Figure 3. It follows that the average linear rate of solid flow in the annular zone is proportionately less than that in the central zone.

Referring now to Figure 5, we find the baffles 30, 32 and 33 added within the vessel. Baffle 30 has been positioned in such a way as to substantially prevent solid flow at its level substantially throughout that area of the vessel formerly occupied by the excessive flow zone 56, of Figure 4. Lines drawn at the angle of internal flow of the solid from the edges of the baffle 30 will indicate the boundaries of a small new zone of stagnant solid 64. Lines extended vertically from the apices of the zones 57 and 64 will indicate the boundary between two new zones of flow now existing, zones 66 and 67. It will be seen from Figures 4 and 5 that the total cross-sectional area of the two new zones of flow 66 and 67 is substantially greater than that of the annular zone of flow 56. As a result, the rate of solid flow in the zones 66 and 67 is lower and more uniform than that in zone 56. Within the central portion of each of these zones the solid flow may be excessive and the baffles 32 and 33 are positioned across these portions of such zones. These baffles likewise give rise in each case to two new zones of flow thereabove. The excessive rate of flow zones have now been sufficiently broken up as to provide substantially uniform and equal linear flow of solid within the zones 68, 69, 70 and 71 within a short distance above the baffles 32 and 33. It will be seen that these zones together cover the entire vessel cross-section. The positioning of the baffle 30 as will now be described is also typical of the positioning of the baffles 32 and 33. Looking at a horizontal cross-section of the vessel 50 at any level above baffle 30 and below baffles 32 and 33, the zone 66 will be seen to be circular in section and the zone 67 to be annular in section. The baffle 30 should preferably be so positioned that the ratio of the cross sectional area of zone 67 to that of zone 66 is substantially the same as the ratio of the restricted vessel cross-section between baffle 30 and the conical vessel shell 51 to the restricted cross sectional area between baffle 30 and baffle 28. Thus the volumetric flow of solid from zones 66 and 67 past the baffle 30 will be substantially proportional to the cross-section of said zones. It will be apparent that in vessels of extremely large cross-section even further subdivision of the excessive flow zones will be necessary by provision of another row or rows of baffles similar to baffles 32 and 33 and thereabove. It will be obvious that in any case a slight variation in rate of solid flow will still exist across zones such as 68, 69, 70 and 71, and that this variation may be made smaller, the greater the number of rows of baffles. It is generally practical to tolerate a small relatively unimportant variation of solid flow in such zones in the interest of the economy of construction obtained by the use of the least possible number of baffles. It will be noted that a zone of excessive flow 56 has been created below the baffles and a small restricted zone of slow solid flow immediately above each baffle, but these zones being of small volume and being restricted to the portion of the vessel devoted for the purpose of flow equalization are of minor importance.

In vessels of smaller cross sectional area wherein the difference in cross-section between the central solid material outlet and that of the vessel is small, the use of two baffles may be sufficient to provide substantially uniform solid flow in the column thereabove. Such an arrangement is shown in Figure 6 in which is shown, partially in sections the lower end of a vessel 45 having solid outlet conduit 26. The baffles 28 and 30 are supported within this vessel.

Although the discussion hereinbefore has been limited to vessels of circular cross-section, this invention is not limited thereto. Vessels of any desired shape may be used provided that the construction and shape of the baffles are modified accordingly. Generally it is preferable that the baffles have the same projected horizontal shape as that of the vessel in which they are used. Use of more than one solid material outlet with corresponding multiple arrangements of baffles within large vessels is a possible but less preferable form of this invention.

The vessels shown hereinabove have all been shown with conical or tapered bottoms which is desirable in so far as such construction largely eliminates pockets of stagnant solid material in the bottom of the vessel, especially when the slope of the tapered sides of the drain section are greater than the angle of repose of the solid material. Where such zones of stagnant solid are not objectionable in the lower section of the vessel, the bottom thereof need not be tapered. Such a construction is shown in Figure 7 in which is shown the lower end of a vessel 40 having a rounded bottom 41, a centrally located solid material outlet 26 with throttle valve 27 thereon, and gas inlet conduit and channels 23 and 24 respectively. Also shown are baffles 28, 75, 76 and 77. It will be noted that the baffles 76 and 77 are sloped in an opposite direction from the baffles shown heretofore. Such baffles may be sloped in either direction within the scope of this invention provided that the baffles are properly positioned. It will also be seen that the vapor inlet to the vessel 40 is located below the level of the baffles within the vessel. Since the baffle arrangement of this invention does not necessarily require a reduction of free solid material column area for vapor flow adjacent the baffles within a vessel which is substantially greater than that reduction caused by the row of vapor distribution channels themselves, the introduction of gas below the level of the baffles within the vessel becomes feasible. This permits some use of the space devoted to baffling for conversion or treating purposes.

The use of the flow equalizing baffles is obviously not to be restricted to vessels devoted solely to solid-gas contacting operations, but is broadly useful in any application where particle form solid material is passed as a substantially compact column through a vessel of large cross sectional area. Moreover, the baffles may be used in vessels wherein some sort of baffle packing is provided in the reaction zone for the purpose of aiding gas-solid contact, provided that the pattern of such baffle packing is substantially uniform across the entire cross-section of the vessel.

As has been shown the use of the baffles of this invention results not only in provision of uniform solid flow within a vessel thereabove, but also results in a substantial decrease in the volume of stagnant solid material within the vessel. This is of considerable importance in operations of the nature of catalytic hydrocarbon conversion wherein the solid material in such zones might gradually accumulate excessive amounts of cokey material. The proper slope of the baffles is of some importance both as regards such zones of stagnant solid and as regards the formation of zones which are substantially free of solid material. Reference may now be made to Figures 8, 9 and 10. In Figure 8 are shown two horizontal baffles 85 and 86 within a column of downwardly flowing solid material, part of which column 87 is shown. Below the baffles 85 and 86 are the solid free spaces 88 and 89 respectively, and above the baffles are the zones of stagnant solid material 90 and 91 respectively. As hereinbefore shown the stagnant material zones are determined by the angle of internal flow of the solid material and the solid free zones by its angle of repose. Turning now to Figure 9, we find the same baffles positioned at a slope of approximately 45°. It will be seen that the solid free zone has been entirely eliminated and the stagnant flow zone substantially decreased. In Figure 10, the same baffles are shown positioned at a slope of approximately 60° and it will be observed that the zone of stagnant solid has been still further reduced. It will be noted that larger baffles are required as the slope thereof is increased in order that their projected horizontal areas cover the same vessel cross-section. It is generally practical to compromise between reduction of solid free zones and stagnant zones on the one hand and size of baffles on the other hand. Obviously such compromise as also the precise dimensioning and positioning of the baffles themselves will depend largely upon the nature of the solid material involved in a particular application, the nature of the process involved and the size of the vessel involved. In general the baffles should not be positioned essentially vertically and preferably they should be positioned so as to form an angle with the horizontal between about 30 and 70 degrees.

It should be understood that all the foregoing illustrations of the method and apparatus of this invention and the use thereof are intended merely as illustrative and are in no way intended to limit the scope of this invention.

I claim:

1. A method for maintaining uniform flow of a column of particle form solid and of gaseous hydrocarbon reactant through an elongated chamber of substantial horizontal cross sectional area comprising: maintaining a column of downwardly flowing particle form solid within said chamber, replenishing said column at the upper end thereof with said solid, withdrawing said solid from a substantially central location at the bottom of said column as a single throttled stream of solid, baffling the flowing solid within the lower end of said column directly above said central drain location so as to create a peripheral zone of solid flow in said column, adjacent said baffling, of substantially greater cross sectional area than that of said central baffled area, baffling at a level above that of said first-named baffling said peripheral zone of solid flow substantially across that portion of its cross sectional area where the linear rate of flow of the solid would be excessive in the absence of said baffling so as to divide the solid flow in said column immediately thereabove into two zones of solid flow having a total cross sectional area substantially greater than that of said peripheral zone of flow, the relative amounts of volumetric flow of solid from the zones of flow thus formed to said peripheral zone of flow being substantially in direct proportion to the relative horizontal cross sectional areas thereof, further baffling the flowing solid within said column at other levels spaced above said latter baffling level in such a way as to progressively increase the number of zones of solid flow above each of said baffling levels, said further baffling being continued until the downward linear flow of solid above the uppermost of said baffling levels is practically uniform across the entire column cross-section, said baffling in said peripheral zone of flow and at said other levels thereabove being accomplished by means of baffles each of which is in the form of the frustum of a thin-walled, hollow cone; and at the same time passing gaseous hydrocarbon reactant through said column including that portion wherein said solid flow is baffled.

2. In a process of the type described a method for maintaining uniform flow of a column of particle form solid through an elongated chamber of substantial horizontal cross sectional area comprising: maintaining a column of downwardly flowing particle form solid within said chamber, replenishing said column at the upper end thereof, continuously withdrawing solid from the bottom of said column in a single throttled discharge stream while baffling said solid flow within the lower end of said column at at least two elevational levels, the baffling at any of said levels above the lowermost being accomplished by inclined baffles, each of which has at any point along its length the vertical cross-sectional shape of a thin metal slat having its two parallel broader surfaces positioned at a slope with the horizontal less than 70 degrees and greater than 30 degrees and being so placed as to substantially restrict solid flow at those portions of the cross sectional area of said column where the linear rate of flow of solid would be excessive in the absence of baffling at that level; and at the same time passing gaseous material through said column including that portion wherein said solid flow is baffled.

3. A method for contacting gaseous reactants with a moving column of particle form solid contact mass material with substantially uniform downward flow of all portions of the contact mass material column comprising: maintaining a column of downwardly moving particle form solid contact mass material, replenishing said column at the top thereof, baffling the solid flow in said column at a level near the lower end thereof with a plurality of spaced, annular, band-type baffles, concentrically arranged, each of said annular, band-type baffles having its inner and outer surfaces substantially parallel and being of small thickness between said inner and outer surfaces and having said parallel inner and outer surfaces set on a slope with the horizontal which is greater than the angle of repose of said solid and less than its angle of internal flow, said baffles being so placed as to substantially restrict solid flow at those portions of the cross sectional area of said column at said level where the linear rate of flow of the solid would be excessive in the absence of baffling at said level, baffling the solid flow at a second and lower level within said column with a similarly set similar, annular, band-type baffle, likewise so placed as to substantially restrict the solid flow at that portion of the cross sectional area of said column at said second level where the linear rate of flow of solid would be excessive in the absence of baffling at said second level, further baffling said solid flow at a third and still lower level within said column with a substantially centrally placed baffle having the shape of an upright cone, the sides of which form an angle with the horizontal greater than the angle of repose of said solid and less than an angle of 90 degrees with the horizontal, said baffle being such as will substantially restrict solid flow at that central portion of the column cross sectional area where the linear rate of flow of said solid would be excessive in the absence of said baffling at said level, finally withdrawing solid from the bottom of said column at a location substantially centrally located directly below said latter baffle in a single throttled discharge stream, and at the same time introducing gas to said column at a level below said baffling at controlled reaction temperatures and withdrawing gaseous products from said column at a level above said baffling.

4. An apparatus for contacting gases with particle form solid material comprising: an elongated vessel laterally confining a substantially compact column of downwardly flowing particle form solid material, means to introduce said solid near the top of said vessel, conduit means, substantially centrally located on the bottom of said vessel for withdrawing said solid, means associated with said withdrawal conduit for throttling the flow of solid therethrough, a baffle, substantially centrally located, supported within the lower end of said vessel a short distance above and directly over said withdrawal conduit, said baffle having a projected cross sectional area substantially less than that of said vessel but sufficient to prevent the flow of said solid at the level of said baffle and shortly thereabove in substantially all that central portion of the vessel cross-section where the linear rate of flow of the solid would be excessive in the absence of said baffle, said baffle thereby creating a peripheral zone of solid flow within said vessel adjacent the baffle, a second baffle of hoop type and having closely spaced, parallel, sloping sides supported within said peripheral zone of solid flow at a level within said vessel shortly above the lower extremity of said former baffle, said second baffle having such a projected horizontal cross sectional area between the projections of its inner and outer peripheries as to prevent solid flow at the level of said baffles and shortly thereabove substantially throughout that portion of the cross-section of said peripheral zone of solid flow where the linear rate of solid flow would be excessive in the absence of said baffle while permitting the flow of solid adjacent the edges of said baffle on either side thereof, thereby creating two zones of solid flow in said vessel above said baffle from which zones solid flows to said peripheral zone of flow at relative volumetric rates of flow proportional to the relative cross sectional areas of said zones of flow, said zones of flow thereby providing substantially uniform downward solid flow throughout the entire cross-section of said vessel thereabove, gas handling means communicating the interior of said vessel with the exterior at a level below said baffles and gas handling means communicating the interior of said vessel with the exterior at a level above said baffles.

5. An apparatus for contacting gases with particle form solid material comprising: a vessel laterally confining a substantially compact column of downwardly flowing particle form solid material, means to introduce said solid near the top of said vessel, conduit means, substantially centrally located on the bottom of said vessel for withdrawing said solid, means associated with said withdrawal conduit for throttling the flow of solid therethrough; a centrally located baffle arranged above and spaced vertically away from said withdrawal conduit to prevent direct flow of solid thereinto and create a peripheral zone of solid flow, above said first-named baffle an annular shaped baffle located in said zone of peripheral flow to obstruct the flow of solid therein and create above it two zones of downward flow of solid, said annular shaped baffle being in the form of a thin annular band having its inner and outer surfaces substantially parallel and set at an angle with the horizontal, above said second-named baffle a pair of annular shaped, concentrically arranged baffles, one supported in each of said two zones of flow created by the second-named baffle, each of said last named baffles being in the form of a thin, annular band having its inner and outer surfaces substantially parallel and set at an angle with the horizontal, the projected area of the baffles at each level being sufficiently great to break up solid material flow zones created by the baffles at the level immediately therebelow, gas inlet means connecting into said vessel below said baffles and gas outlet means connecting into said vessel above said baffles.

6. An apparatus for contacting gases with particle form solid material comprising: a vessel laterally confining a substantially compact column of downwardly flowing particle form solid material, means to introduce said solid near the top of said vessel, conduit means, substantially centrally located on the bottom of said vessel for withdrawing said solid, means associated with said withdrawal conduit for throttling the flow of solid therethrough, a centrally located baffle having upwardly converging sides arranged above and spaced vertically away from said withdrawal conduit to prevent direct flow of solid thereinto and a system of annular shaped secondary baffles associated therewith, each of said secondary baffles being comprised of a single sheet strip having its side set at an angle with the horizontal greater than 30 degrees and less than 70 degrees, the said secondary baffles being so located and of such projected areas as to substantially prevent the persistence through any substantial vertical distance in the reactor of zones wherein the solid material flows at an excessive rate, gas handling means communicating the interior of said vessel with the exterior at a level below said baffles and gas handling means communicating the interior of said vessel with the exterior at a level above said baffles.

7. An apparatus for treatment of moving particle form solid material comprising: a substantially vertical vessel suitable for confining a substantially compact column of downwardly flowing particle form solid material, means to admit said solid near the upper end of said vessel, means to withdraw said solid from a substantially central location at the bottom of said vessel; flow throttling means associated with said withdrawal means; a system of baffles placed at spaced vertical levels within the lower end of said vessel, the baffle at the lowermost level being substantially centrally placed above said solid withdrawal means and having upwardly converging sides which form an angle greater than the angle of repose of said solid with the horizontal and each of the baffles at the said levels thereabove having at any point along its length a vertical cross-sectional shape corresponding to that of a thin metal slat having its broader parallel surfaces positioned to form an angle with the horizontal greater than the angle of repose and less than the angle of internal flow of said solid, all of said baffles at any of said levels being so positioned and having such a projected horizontal cross-section as to prevent the solid flow substantially throughout that portion of the vessel cross-section at said level where the linear rate of flow of the solid would be excessive in the absence of the baffles while permitting solid flow adjacent the edges of said baffles on either side thereof, said baffles starting with the lowermost thereby acting to gradually increase the number of zones of flow within said vessel to such an extent as to provide substantially uniform downward flow of solid across the entire vessel cross-section above the uppermost level of baffles, gas handling means communicating the interior of said vessel with the exterior at a level below said baffles and gas handling means communicating the interior of said vessel with the exterior at a level above said baffles.

8. In an apparatus of the type described for conducting gaseous reactions in the presence of a moving particle form solid contact mass material with substantially equal utilization of all portions of the contact mass; an elongated vertical vessel suitable for confining a substantially compact column of downwardly flowing particle form solid contact mass material; means to introduce said solid near the upper end of said vessel; conduit means substantially centrally located upon the bottom of said vessel for withdrawing said solid; flow throttling means associated with said withdrawal conduit, a baffle, substantially centrally located, supported within the lower end of said vessel a short distance above and directly over said withdrawal conduit, said baffle having sides converging upwardly at an angle with the horizontal greater than 30 degrees, said baffle having a projected horizontal cross section of approximately the same contour as that of said vessel and substantially less than that of said vessel but sufficient to prevent flow of said solid at the level of said baffle and shortly thereabove substantially throughout that central portion of the vessel cross section where the linear rate of flow of the solid would be excessive in the absence of said baffle, said baffle thereby creating a peripheral zone of solid flow within said vessel adjacent the edges of said baffle; a second baffle of annular shape supported shortly above the base of said first baffle and symmetrically within said peripheral zone of solid flow, said annular-shaped baffle being in the form of a thin, annular band having at any point along its length, its inner and outer surfaces substantially parallel and set at an angle with the horizontal which is less than 70 degrees and greater than 30 degrees, said annular-shaped baffle being of substantially the same horizontal contour as the shell of said vessel and having a projected horizontal area of such magnitude to obstruct the flow of solid at the level of said baffles only substantially throughout that portion of the cross section of said peripheral zone of solid flow wherein the linear rate of solid flow would be excessive in the absence of said baffle while permitting the flow of solid adjacent the edges of said baffle on either side thereof, thereby giving rise to two zones of solid flow in said vessel above said baffle from which zones the relative volumetric rate of solid flow to said peripheral zone of flow is directly proportional to the relative cross-sectional area of said two zones of flow, similar annular shaped baffles having similarly sloped sides supported concentrically, one in each of said two zones of solid flow created by said second named baffle a short distance above said second named baffle, each of said baffles similarly breaking up a solid material zone of flow into two zones of flow thereabove, said resulting zones of flow providing substantially uniform downward flow of solid throughout the entire cross section of said vessel thereabove; gas passage defining means communicating the interior of said vessel with the exterior at a level below said baffles and gas passage defining means communicating the interior of said vessel with the exterior at a level above said baffles.

9. In a process of the type described a method for maintaining uniform flow of a column of particle form solid through an elongated chamber of substantial horizontal cross-sectional area comprising: maintaining a column of downwardly flowing particle form solid within said chamber, replenishing said column at the upper end thereof, continuously withdrawing solid from the bottom of said column in a single throttled discharge stream while baffling said solid flow within the lower end of said column at at least two elevational levels, the baffling at any of said levels above the lowermost being accomplished by means of inclined, spaced baffles each of the baffles having at any point along its length the vertical cross-sectional shape of a parallelogram, the broader sides of which are close together and positioned at a slope with the horizontal not greater than the angle of internal flow of said particle form solid material, the baffles at any given level being so placed as to substantially restrict solid flow at those portions of the cross-sectional area of said column where the linear rate of flow of solid would be excessive in the absence of baffling at that level, introducing gas into the lower end of said column below said baffling and withdrawing gas from the upper section of said column above said baffling.

JOHN A. CROWLEY, Jr.

REFERENCES CITED

The following references are of record in the file of this patent:

UNITED STATES PATENTS

| Number | Name | Date |
|---|---|---|
| 1,702,311 | Pantenburg | Feb. 19, 1929 |
| 2,331,433 | Simpson et al. | Oct. 12, 1943 |
| 1,553,944 | Laughlin | Sept. 15, 1925 |

(Other references on following page)

FOREIGN PATENTS

| Number | Country | Date |
|---|---|---|
| 240,533 | Great Britain | Oct. 1, 1925 |
| 501,249 | Great Britain | Feb. 23, 1939 |
| 933,898 | France | Sept. 14, 1909 |
| 665,689 | France | Sept. 21, 1929 |
| 2,385 | Germany | Dec. 15, 1877 |
| 703,784 | France | May 6, 1931 |

OTHER REFERENCES

Simpson et al., "The Oil and Gas Journal" of November 12, 1942, pages 96, 99, 100, 102 and 104. (Copy in Div. 31.)

Simpson et al., "National Petroleum News" of December 1, 1943, pages R-563, 564, 566 and 567. (Copy in Div. 31.)